No. 840,687.　　　　　　　　　　　　　　　　　　PATENTED JAN. 8, 1907.
J. W. BROWN.
FRICTION CLUTCH.
APPLICATION FILED AUG. 24, 1906.
2 SHEETS—SHEET 2.
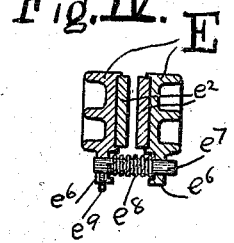
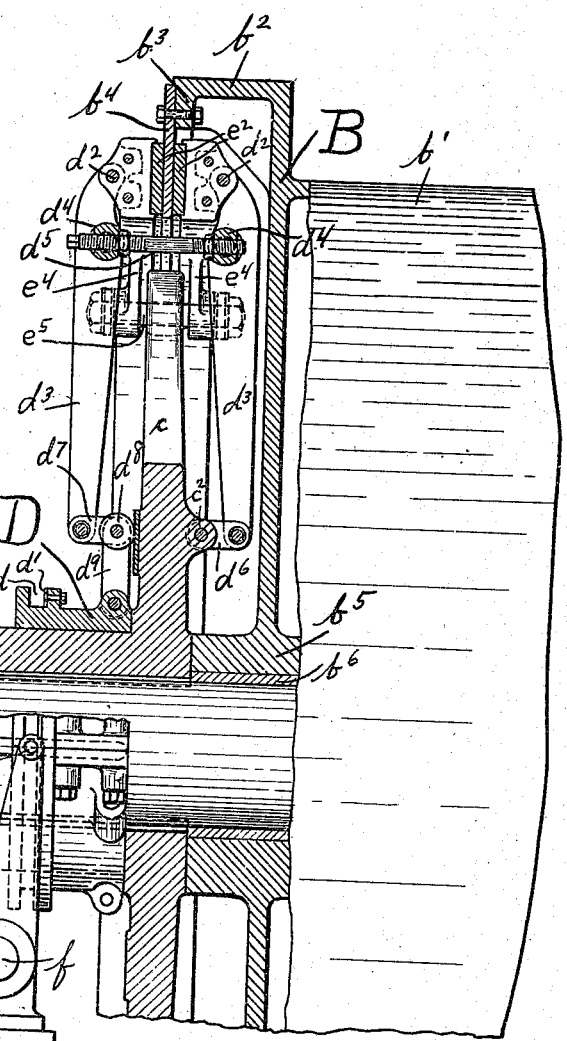
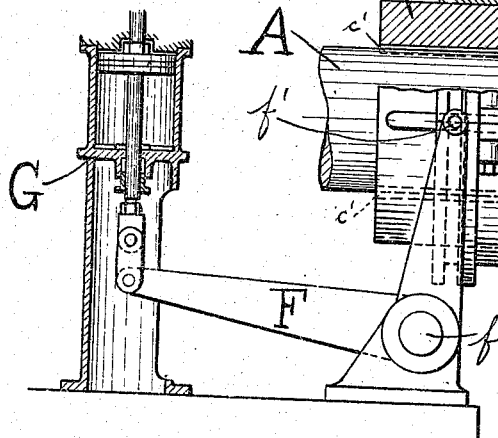
WITNESSES:
Frank E. Dennett
Johan Olsen
John W. Brown, INVENTOR
BY
G. F. DeWein, ATTORNEY.
THE NORRIS PETERS CO., WASHINGTON, D. C.

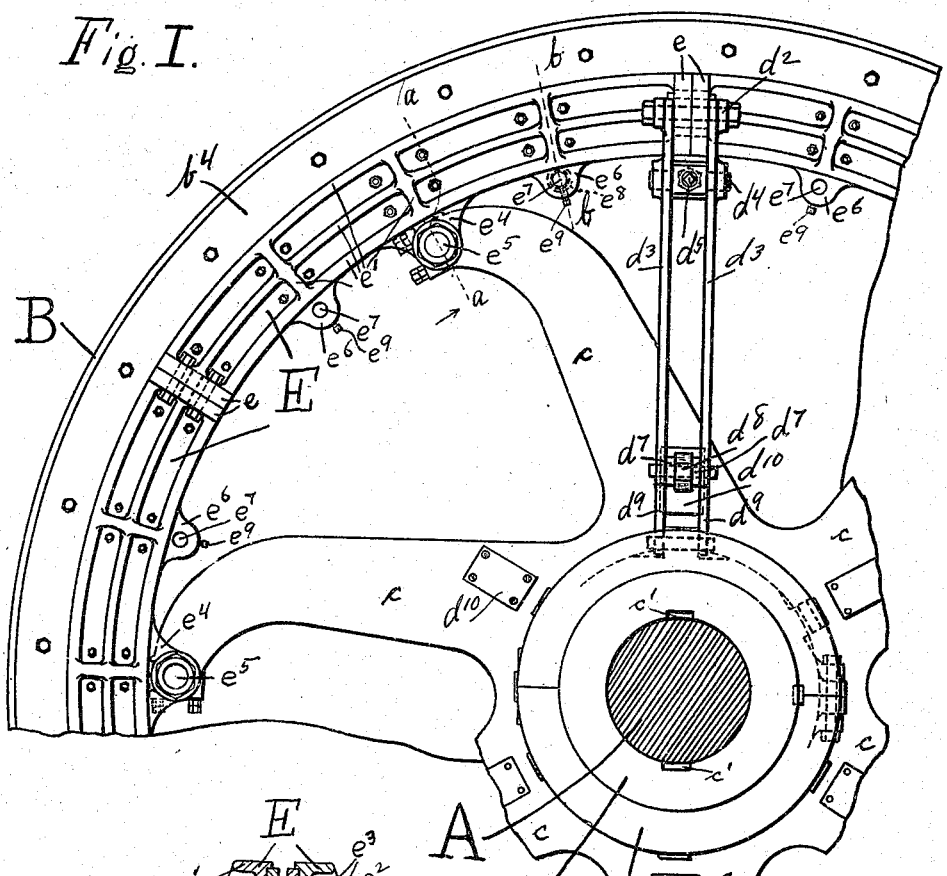
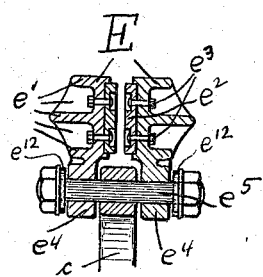

UNITED STATES PATENT OFFICE.

JOHN W. BROWN, OF MILWAUKEE, WISCONSIN, ASSIGNOR TO ALLIS-CHALMERS COMPANY, OF MILWAUKEE, WISCONSIN, A CORPORATION OF NEW JERSEY.

FRICTION-CLUTCH.

No. 840,687.

Specification of Letters Patent.

Patented Jan. 8, 1907.

Application filed August 24, 1906. Serial No. 331,834.

*To all whom it may concern:*

Be it known that I, JOHN W. BROWN, a citizen of the United States, residing at Milwaukee, in the county of Milwaukee and State of Wisconsin, have invented certain new and useful Improvements in Friction-Clutches, of which the following is a specification.

This invention relates to friction-clutches, and is designed in order to secure an extremely powerful and efficient form of clutch.

In the drawings which accompany this specification and form a part of the same, and on which the same reference characters are used to designate the same elements wherever they appear in each of the several views, Figure 1 is an elevation of a fragment of a pulley-wheel with the clutch applied thereto. Fig. 2 is a vertical section of a similar fragment. Fig. 3 is a vertical section taken on the line $a\, a$ on Fig. 1 looking in the direction indicated by the arrow. Fig. 4 is a section on the line $b\, b$ on Fig. 1.

The reference character A represents a shaft upon which the pulley B is seated and about which said pulley is rotatable independently of the rotation of said shaft. This pulley, as shown, is composed of a hub portion $b^5$, which encircles the shaft, the bushing $b^6$ being interposed between the shaft and the hub, the pulley being provided with a winding-drum $b'$ and an outstanding flange $b^2$, which is provided with an inwardly-extending extension $b^3$, to which is secured the friction flange or plate $b^4$.

The reference-letter C represents the clutch-hub, which is keyed to the shaft by means of the keys $c'$. This hub is shown as provided with drag-arms $c$, and each of these arms is provided with a projection $c^2$ on the side toward the pulley.

The reference character D represents a sleeve carried by the hub C and slidable longitudinally thereon.

Reference character E represents the clutch members proper. There are two of these members, one of which is positioned upon one side of the friction-flange $b^4$ and the other of which is positioned upon the opposite side of said flange. Each of these members is composed of a plurality of sections, as clearly shown by Fig. 1 of the drawings, the sections being firmly bolted together to form complete rings. These sections are provided with stiffening and strengthening lugs $e'$, and to their inner surfaces are secured wooden friction-pieces $e^2$, held in place by bolts $e^3$. Each section is further provided with projecting lugs $e^4$ and $e^6$, there being two of the latter on each section. When the sections are assembled to form the clutch members and the members are placed in their operative position, they are secured to the dragtive-arms of the clutch-hub by means of bolts $e^5$, passed through the lugs $e^4$, which bolts may be provided with rubber washers $e^{12}$. Through the lugs $e^6$ rods $e^7$ are passed, which rods are held from endwise movement with respect to one lug by means of set-screws $e^9$, but are freely movable with respect to the other lug, spiral springs $e^8$ being retained upon said rods between said lugs, the purpose of the springs being to normally force the friction members apart.

As shown by Figs. 1 and 2, the sections which compose each ring member are assembled directly opposite each other, and at the junction of two adjacent sections is provided a bolt $d^2$, upon which are secured levers $d^3$. In the construction shown by Figs. 1 and 2 there are four of these levers grouped together. The two which are connected to the same friction member will in the claims be referred to as a single lever, so that four of the levers, as shown, will be referred to as constituting a pair of levers. The two levers $d^3$ connected to the same friction member are united by a bolt $d^4$. An adjustable bolt $d^5$ connects the bolts of the two pairs opposite each other, forming an adjustable fulcrum. The other ends of the levers $d^3$, adjacent the pulley, are secured to the projections $c^2$ by means of links $d^6$. The corresponding ends of the other levers are connected to toggle members $d^7$, upon the other ends of which are antifriction-rollers $d^8$, which are adapted to roll upon hardened bearing-plates $d^{10}$. The sleeve D is connected with the toggle members $d^7$ by the links $d^9$, connected to the axles of the antifriction-rollers $d^8$. The sleeve member D is provided with a circumferential slot $d$, against the inner face of which is secured the brass liner $d'$.

In Fig. 2 is shown a fluid-actuated mechanism G, connected with the bell-crank lever F, which is adapted to rock upon the axis $f$ and which engages, by means of a lug $f'$, with the sleeve D by entering the slot $d$, whereby the sleeve D may be moved longitudinally of the shaft, so that the friction members E can be forced against the friction-flange $b^4$ and caused to tightly grip the same or can be permitted to separate.

The operation of the apparatus is as follows: Assuming the shaft A to be rotating and the pulley B remaining stationary thereon, the two annular clutch members E are being dragged around by the clutch-hub C and are rotating out of contact with the radially-projecting flange $b^4$. Assuming now that it becomes desirable to clamp the clutch, the lever F being moved so as to slide the sleeve D toward the right, Fig. 2, the links $d^7$ will be pushed outwardly by the links $d^9$. This action will cause one or the other, or both, of the annular clutch members E to approach the radially-projecting flange $b^4$; but whatever the action with respect to said flange said clutch members will be caused to approach each other. Now if one of said annular clutch members should contact with the radially-projecting flange $b^4$ the other is still free to move and will continue its movement until said movement is arrested by said member impinging upon said flange $b^4$.

What I claim is—

1. The combination with a shaft of a pulley rotatable concentrically therewith but independently thereof, said pulley being provided with a radially-projecting flange, a clutch-hub rigidly secured to said shaft, two annular clutch members directly secured to and adapted to be rotated by said clutch-hub and located one on each side of said flange, levers connected to said annular clutch members and extending toward said shaft, fulcrum-bars, each of said bars uniting a lever connected with one of the annular clutch members with a lever connected with the other of said annular clutch members, one lever of each pair thus united being secured to said clutch-hub, and means for operating the other levers.

2. The combination with a shaft of a pulley rotatable concentrically therewith but independently thereof, said pulley being provided with a radially-projecting flange, a clutch-hub rigidly secured to said shaft, two annular clutch members directly secured to and adapted to be rotated by said clutch-hub and located one on each side of said flange, means for normally separating said annular clutch members, levers connected to said annular clutch members and extending toward said shaft, fulcrum-bars, each of said bars uniting a lever connected with one of the annular clutch members with a lever connected with the other of said annular clutch members, one lever of each pair thus united being secured to said clutch-hub, and means for operating the other levers.

3. The combination with a shaft of a pulley rotatable concentrically therewith but independently thereof, said pulley being provided with a radially-projecting flange, a clutch-hub rigidly secured to said shaft, two annular clutch members directly secured to and adapted to be rotated by said clutch-hub and located one on each side of said flange, levers connected to said annular clutch members and extending toward said shaft, fulcrum-bars, each of said bars uniting a lever connected with one of the annular clutch members with a lever connected with the other of said annular clutch members, one lever of each pair thus united being secured to said clutch-hub, toggle members, one for each of the other levers, and means for operating said toggle members.

4. The combination with a shaft of a pulley rotatable concentrically therewith but independently thereof, said pulley being provided with a radially-projecting flange, a clutch-hub rigidly secured to said shaft, two annular clutch members directly secured to and adapted to be rotated by said clutch-hub and located one on each side of said flange, each of said annular clutch members being movable toward or away from said radially-projecting flange independently of the other, and means to engage said annular clutch members with said flange.

5. The combination with a shaft of a pulley rotatable concentrically therewith but independently thereof, said pulley being provided with a radially-projecting flange, a clutch-hub rigidly secured to said shaft, two annular clutch members directly secured to and adapted to be rotated by said clutch-hub and located one on each side of said flange, levers connected to said annular clutch members, fulcrum-bars, each of said bars uniting a lever connected with one of the annular clutch members with a lever connected with the other of said annular clutch members, one lever of each pair thus united being connected with said clutch-hub by a link, toggle members, one for each of the other levers, a sleeve to which said toggle members are connected, and means for moving said sleeve longitudinally of said shaft.

6. The combination with a shaft of a pulley rotatable concentrically therewith but independently thereof, said pulley being provided with a radially-projecting flange, a clutch-hub rigidly secured to said shaft, said hub being extended outwardly from said shaft forming arms, two annular clutch members directly secured to and adapted to be rotated by the arms of said clutch-hub and located one on each side of said flange, levers connected to each of said annular clutch members and extending toward said shaft, fulcrum-bars, each of said bars uniting a lever connected with one of the annular clutch members with a lever connected with the other of said annular clutch members, one lever of each pair thus united being secured by means of a link to said clutch-hub, each of the other levers being provided with a toggle member, a sleeve movable lengthwise of said shaft, links connecting said toggle members with said sleeve, means for moving said sleeve lengthwise of said shaft, and springs adapted to separate said annular clutch members.

In testimony whereof I affix my signature in the presence of two witnesses.

JOHN W. BROWN.

Witnesses:
G. F. DE WEIN,
FRANK E. DENNETT.